United States Patent
Chen et al.

(10) Patent No.: US 11,251,707 B2
(45) Date of Patent: Feb. 15, 2022

(54) POWER DELIVERY ARCHITECTURE FOR MULTIPORT SYSTEMS

(71) Applicant: Renesas Electronics America Inc., Milpitas, CA (US)

(72) Inventors: Yen-Mo Chen, Morrisville, NC (US); Sungkeun Lim, Cary, NC (US)

(73) Assignee: Renesas Electronics America Inc., Milpitas, CA (US)

(*) Notice: Subject to any disclaimer, the term of this patent is extended or adjusted under 35 U.S.C. 154(b) by 225 days.

(21) Appl. No.: 16/725,145

(22) Filed: Dec. 23, 2019

(65) Prior Publication Data
US 2020/0244170 A1 Jul. 30, 2020

Related U.S. Application Data

(60) Provisional application No. 62/798,959, filed on Jan. 30, 2019.

(51) Int. Cl.
| H02M 3/158 | (2006.01) |
| H02J 7/00 | (2006.01) |
| H02J 1/10 | (2006.01) |

(52) U.S. Cl.
CPC .......... *H02M 3/1582* (2013.01); *H02J 1/102* (2013.01); *H02J 7/007* (2013.01)

(58) Field of Classification Search
CPC ......... H02M 3/1582; H02J 1/102; H02J 7/007

USPC ......................................... 320/140
See application file for complete search history.

(56) References Cited

U.S. PATENT DOCUMENTS

| 8,466,662 | B2* | 6/2013 | Nania .................. H02J 3/381 323/207 |
| 10,444,808 | B2* | 10/2019 | Lin .................. G06F 13/382 |
| 10,725,953 | B2* | 7/2020 | Hsieh ................ G06F 13/4068 |
| 2010/0194344 | A1 | 8/2010 | Greyling |
| 2011/0148360 | A1 | 6/2011 | Lee |
| 2011/0156655 | A1 | 6/2011 | Kim |
| 2014/0266011 | A1 | 9/2014 | Mehta et al. |
| 2017/0109311 | A1 | 4/2017 | Gerber et al. |
| 2017/0279284 | A1* | 9/2017 | Lim .................. H02J 7/0045 |
| 2017/0353113 | A1* | 12/2017 | Ono .................. H02J 7/06 |
| 2017/0358947 | A1* | 12/2017 | Waters ............ H02J 13/00016 |
| 2020/0091758 | A1* | 3/2020 | Jahan ................ H02J 7/0019 |
| 2021/0167623 | A1* | 6/2021 | Sanghvi ............ H02J 7/0024 |
| 2021/0208654 | A1* | 7/2021 | Bhattacharjee ........ H02M 3/02 |
| 2021/0223838 | A1* | 7/2021 | Yeh .................. H02J 7/0045 |

* cited by examiner

*Primary Examiner* — Suresh Memula
(74) *Attorney, Agent, or Firm* — Foley & Lardner LLP (57) ABSTRACT

One or more embodiments are directed to a multiport power delivery architecture that reduces the cost and maximize the power utilization. According to some aspects, embodiments solve problems associated with charging a battery with multiple adapter. Some embodiments enable supplying system load and charging a battery from two or more adapters simultaneously through a single sensing resistor.

18 Claims, 11 Drawing Sheets

POWER DELIVERY ARCHITECTURE FOR MULTIPORT SYSTEMS

CROSS-REFERENCE TO RELATED APPLICATIONS

The present application claims priority to U.S. Provisional Patent Application No. 62/798,959 filed Jan. 30, 2019, the contents of which are incorporated herein by reference in their entirety.

TECHNICAL FIELD

The present embodiments relate generally to consumer, industrial, hand held and other computing devices, and more particularly to a power delivery architecture for such devices having multiple ports for receiving or delivering power.

BACKGROUND

Conventional battery chargers that attempt to allow for charging a battery with multiple adapters are costly and inefficient, among other things. Accordingly, improvements are needed.

SUMMARY

One or more embodiments are directed to a multiport power delivery architecture that reduces costs and maximizes power utilization. According to some aspects, embodiments solve problems associated with charging a battery with multiple adapters. Some embodiments enable supplying system load and charging a battery from two or more adapters simultaneously through a single sensing resistor.

BRIEF DESCRIPTION OF THE DRAWINGS

These and other aspects and features of the present embodiments will become apparent to those ordinarily skilled in the art upon review of the following description of specific embodiments in conjunction with the accompanying figures, wherein.

DETAILED DESCRIPTION

The present embodiments will now be described in detail with reference to the drawings, which are provided as illustrative examples of the embodiments so as to enable those skilled in the art to practice the embodiments and alternatives apparent to those skilled in the art. Notably, the figures and examples below are not meant to limit the scope of the present embodiments to a single embodiment, but other embodiments are possible by way of interchange of some or all of the described or illustrated elements. Moreover, where certain elements of the present embodiments can be partially or fully implemented using known components, only those portions of such known components that are necessary for an understanding of the present embodiments will be described, and detailed descriptions of other portions of such known components will be omitted so as not to obscure the present embodiments. Embodiments described as being implemented in software should not be limited thereto, but can include embodiments implemented in hardware, or combinations of software and hardware, and vice-versa, as will be apparent to those skilled in the art, unless otherwise specified herein. In the present specification, an embodiment showing a singular component should not be considered limiting; rather, the present disclosure is intended to encompass other embodiments including a plurality of the same component, and vice-versa, unless explicitly stated otherwise herein. Moreover, applicants do not intend for any term in the specification or claims to be ascribed an uncommon or special meaning unless explicitly set forth as such. Further, the present embodiments encompass present and future known equivalents to the known components referred to herein by way of illustration.

According to certain aspects, the present embodiments provide a power delivery architecture for a multiport system that enables utilizing all power sources from any port to supply charging power and to meet system power demands. The architecture can also support full On-The-Go (OTG) functionality for any port from either or both of a power source or a battery. The architecture enables smaller system area, lower system cost and higher system efficiency, while further enabling a simple control scheme.

Figure 1:
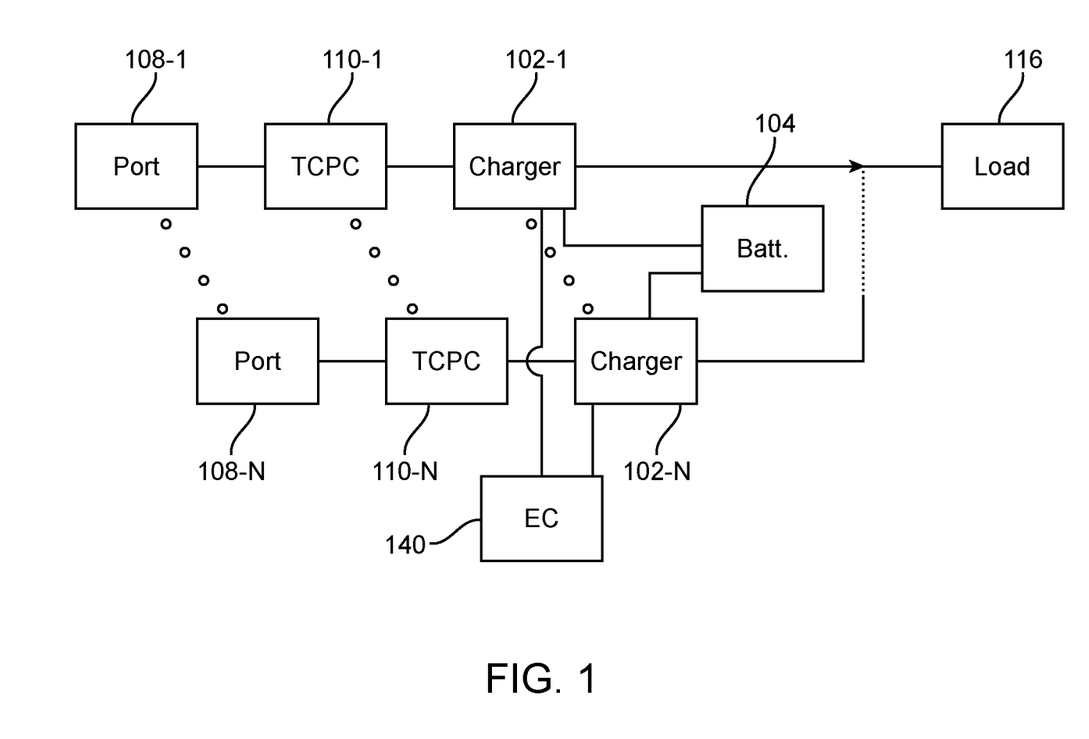
FIG. 1 is a block diagram illustrating aspects of a system in which embodiments may be implemented.

FIG. 1 is a block diagram illustrating aspects of an example system 100 incorporating the present embodiments. System 100 can be a computing device such as a notebook computer (e.g. MacBook, Ultrabook, etc.), laptop computer, pad or tablet computer (iPad, Surface, etc.), etc., a power bank, a USB-C interface platform, or any system using a battery and capable of receiving power from an adapter. In these and other embodiments, system 100 includes a load 116, such as a CPU running a conventional operating system such as Windows or Apple OS, and can be an x86 processor from Intel, AMD or other manufacturers, as well as other processors made by Freescale, Qualcomm, DSPs, GPUs, etc. It should be apparent that system 100 can include many other components not shown such as solid state and other disk drives, memories, peripherals, displays, user interface components, etc. According to certain aspects, a system 100 in which the present embodiments can find particularly useful application has operational power needs that can exceed the power limits of technologies such as USB-A, for example over 60 watts. However, the present embodiments are not limited to applications in such systems.

As further shown, an example system 100 in which the present embodiments can find useful applications includes two or more ports 108-1 to 108-N. Ports 108 can be Universal Serial Bus (USB) ports, such as a USB Type C (USB-C) port or a USB Power Delivery (USB PD) port In a USB Type C example such as that shown in FIG. 1, each port 108 has an associated Type C port controller (TCPC) 110 (i.e. TCPC 110-1 to 110-N). Each TCPC 110 includes functionality for detecting the presence and type of device attached to port 108, controlling switches associated with connecting the attached device to other system 100 components, and for communicating port status to EC 140 (e.g. via an I2C interface). EC 140 is generally responsible for managing power configurations of system 100 (e.g. depending on whether a power adapter is connected or not connected to any of ports 108 as communicated to EC 140 from TCPCs 110, etc.), receiving battery status from battery 104 (e.g. via a separate or incorporated fuel gauge circuit), and for communicating battery charging and other operational control information to charger 102 (e.g. via SMbus interface), as will become more apparent from the descriptions below.

As shown, system 100 includes battery chargers 102-1 to 102-N for each port 108. In embodiments, chargers 102 can include one or more buck-boost narrow output voltage DC (NVDC) chargers. According to certain general aspects, during operation of system 100, when a power adapter is plugged into any of ports 108, the associated battery charger 102 is configured to charge battery 104. Preferably, in addition to charging battery 104, the associated battery charger 102 is further adapted to convert the power from the adapter to a voltage suitable for supplying to components of the system 100, including load 116 (e.g., in a buck mode, a boost mode, or a buck-boost mode as is known in the DC-DC converter art). According to certain other general aspects, when a power adapter is not plugged into any of ports 108, any of battery chargers 102 is configured to manage the supply of power to the load 116 and/or a USB OTG device (e.g. a cell phone, etc.) attached to a port 108 from battery 104 (e.g., in a buck mode, a boost mode, or a buck-boost mode as is known in the art). Further details of battery chargers 102 according to the present embodiments will be provided below. In notebook computer (e.g. Ultrabook) and other embodiments of system 100, battery 104 can be a rechargeable 1S/2S/3S/4S (i.e. 1 cell, 2 cell, 3 cell, or 4 cell stack) Lithium-ion (Li-ion) battery.

According to certain aspects, the present applicant recognizes various problems afflicting conventional systems such as that shown in FIG. 1, and particularly in connection with systems having battery chargers that attempt to accommodate power from or to two or more ports. Among other things, these problems include power delivery inefficiencies, duplicative components that require board space and expense, and complex control schemes, for example when multiple devices and/or adapters are connected to different ports at the same time.

Figure 2:
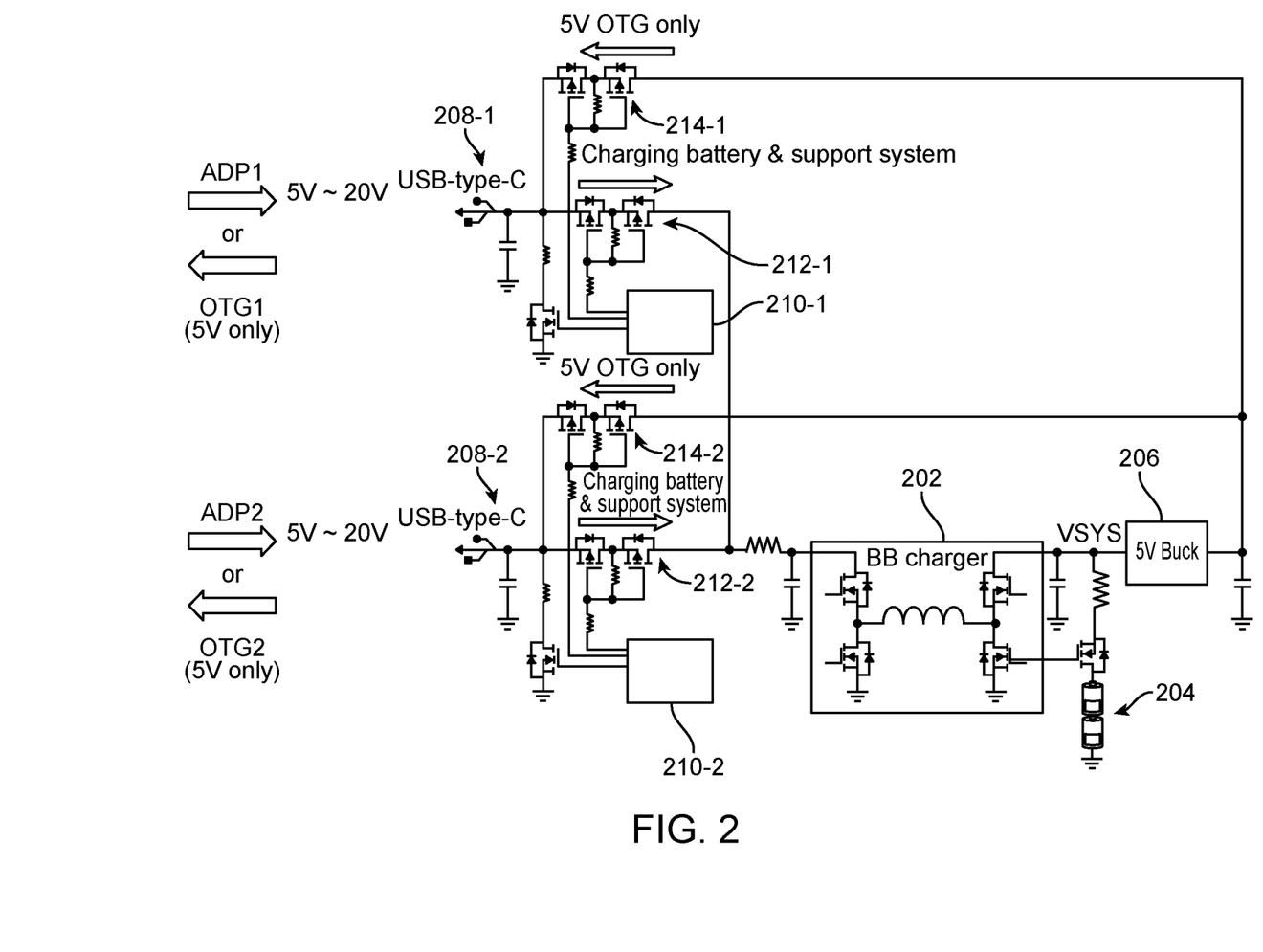
FIG. 2 is a block diagram illustrating issues in connection with attempting to provide a power delivery architecture to fully utilize power from each port.

FIG. 2 is a block diagram illustrating some issues in conventional approaches that attempt to provide a power delivery architecture that accommodates two or more ports.

In this example, a single buck-boost (BB) charger 202 supports system power and charges a battery 204. On-The-Go (OTG) voltage is provided through a single buck converter 206 and is limited to 5V only. Each port 208 includes a PD-IC 210 which controls two pairs of back-to-back FETs 212 and 214. PD-IC 210 controls the FETs 214 so as to couple the OTG voltage (from the battery 204 via buck converter 206) to the port 208 when an adapter is not connected and instead a power consuming device is connected. PD-IC 210 controls the FETs 212 so as to couple the adapter voltage to the BB charger 202 (e.g. for providing system voltage VSYS and/or charging battery 204) when an adapter is connected to port. An embedded controller (EC, not shown) communicates with PD-ICs 210-1 and 210-2 and is needed to ensure that only one adapter is selected to be coupled to BB 202 for supplying power when adapters are plugged into both ports 208-1 and 208-2 simultaneously. Among other things, the present Applicant recognizes that this approach requires complicated logic circuitry, in addition to costly PD-ICs and BFETs, in order to work properly and safely.

Figure 3:
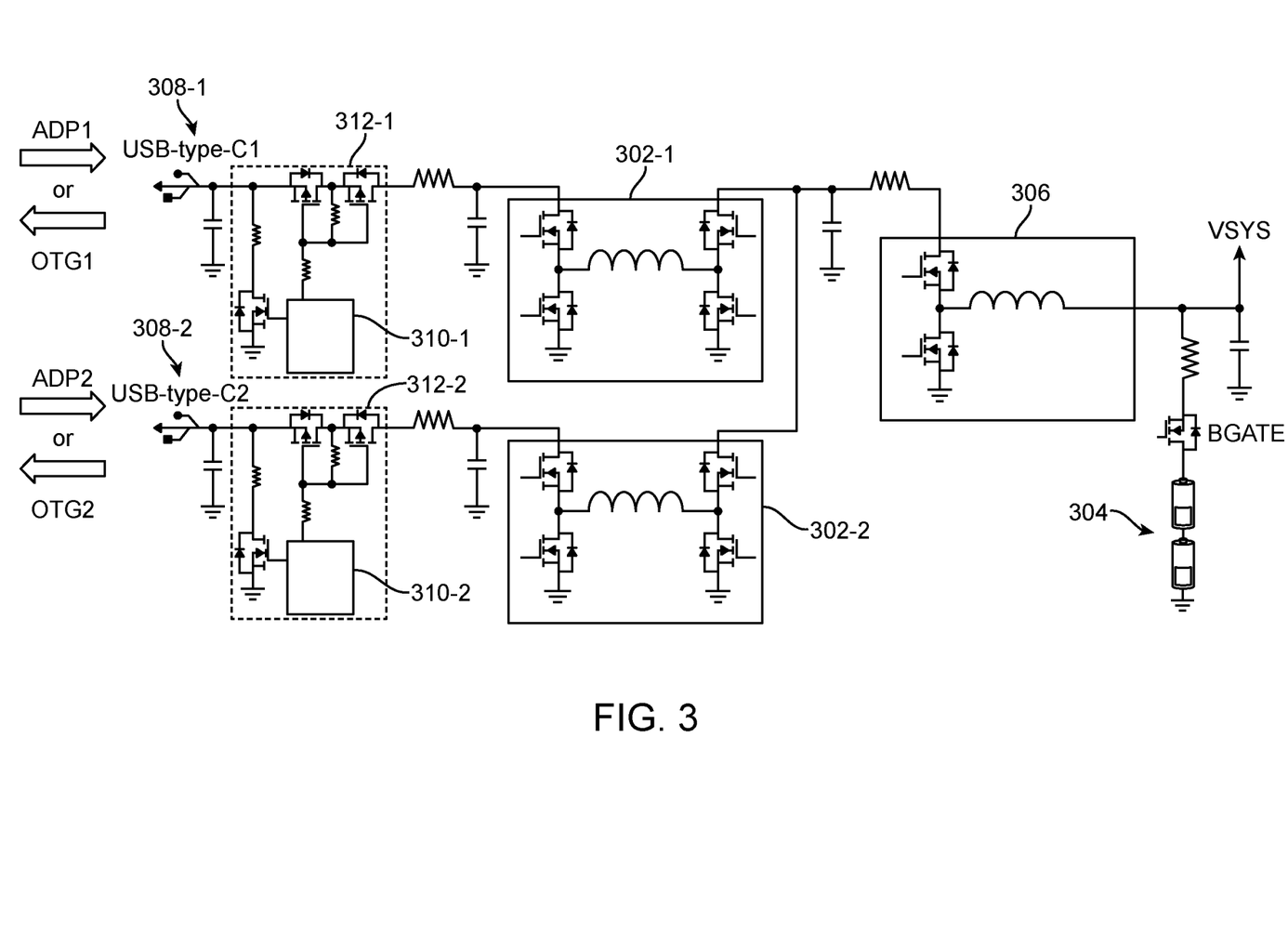
FIG. 3 is a block diagram illustrating one example approach toward addressing the above and other issues.

FIG. 3 is a block diagram illustrating one conventional approach toward addressing some issues in the approach of FIG. 2.

Similar to the above example, adapters from both ports 308 can be connected via PD-ICs 310 and back-to-back FETs 312 for supplying charging power to battery 304 and system demand (i.e. VSYS) via a single buck converter 306. However, this example differs from the previous example by supporting full OTG functionality (i.e. providing OTG voltages of 5V-20V) for both ports 308. It does this by providing separate BB converters 302-1 and 302-2 for each port 308. Accordingly, this approach requires larger system area, higher system cost and lower system efficiency by requiring one more power stage.

Figure 4:
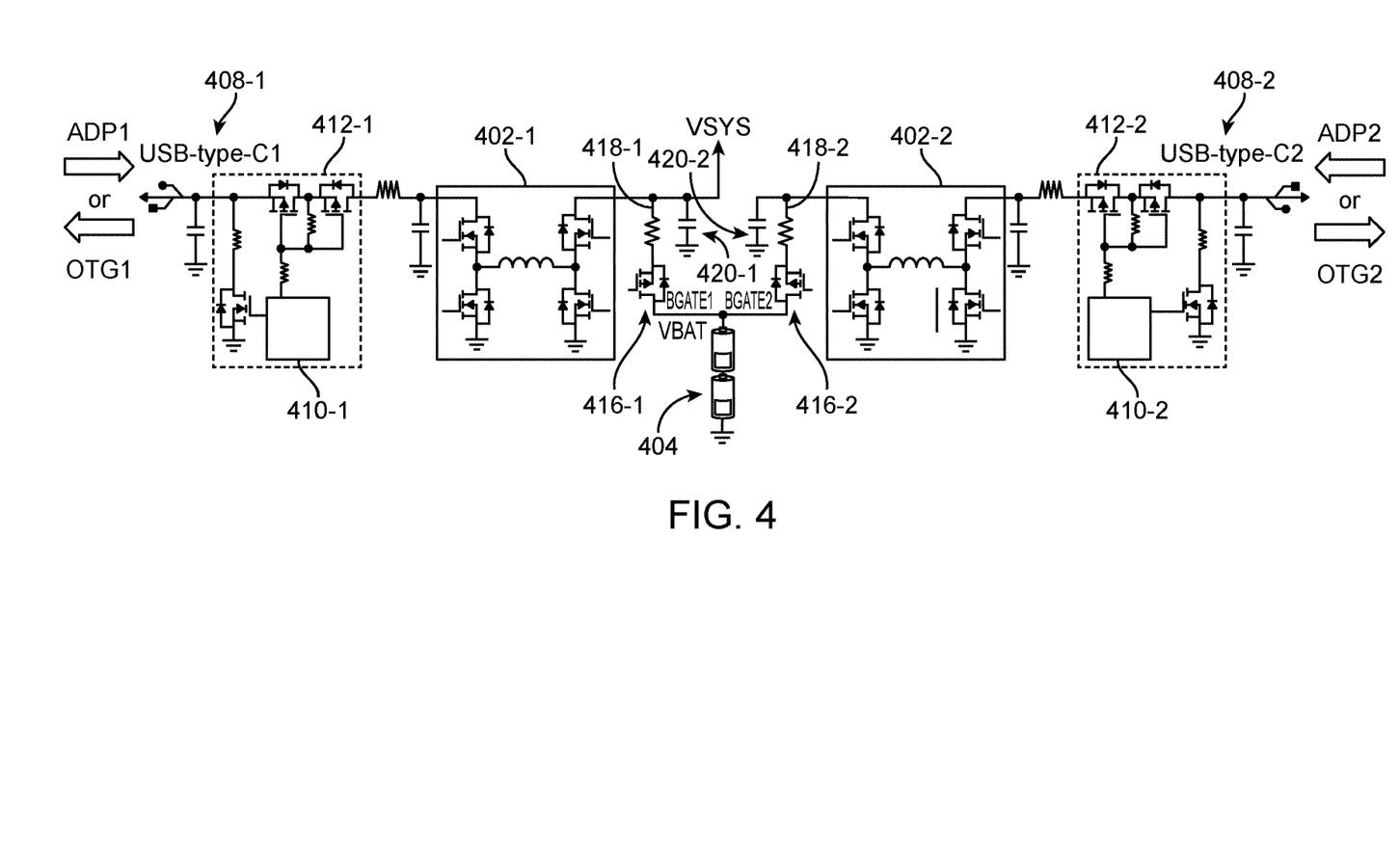
FIG. 4 is a block diagram illustrating another possible example approach.

FIG. 4 is a block diagram illustrating another conventional approach.

Similar to the above examples, adapters from both ports 408 can be connected via PD controllers 410 and back-to-back FETs 412 for supplying power for charging battery 404. Further, as in the previous example, full OTG functionality (e.g. by providing OTG voltages in the full range of 5V-20V) is supported for both ports 408 with separate BB converters 402-1 and 402-2. However, this approach differs from the previous approaches by further requiring two battery side sensing resistors 418, two BGATE FETs 416 and more system side capacitors 420. Moreover, a complicated control scheme is needed to fully utilize power from each port (e.g. Port 408-2 to VSYS requires that both BGATE FETs 416 are turned on).

Another issue in connection with the conventional approach of FIG. 4 is that power from port 408-2 cannot be provided to VSYS, so a user is required to make sure that an adapter is plugged into the correct port 408-1 when system power from an adapter is needed.

Figure 5:
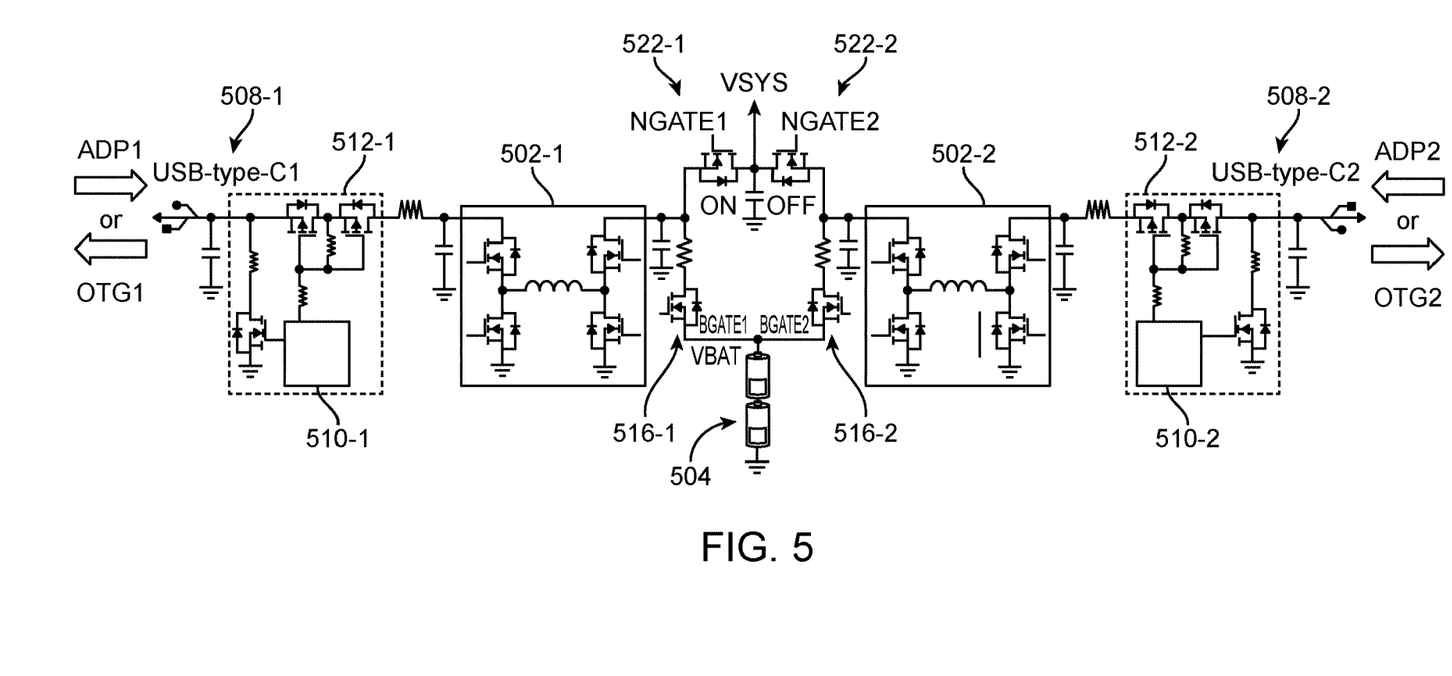
FIG. 5 is a block diagram illustrating another possible example approach.

FIG. 5 is a block diagram illustrating an example approach for addressing this issue of the example approach of FIG. 4.

As can be seen, the example of FIG. 5 includes many of the same components as in the example of FIG. 4. However, the example of FIG. 5 further includes NGATE FETs 522. By controlling these FETs properly, power from both ports 508-1 and 508-2 can be provided to the system, which addresses the issue of requiring a user to connect an adapter to the correct port. However, it suffers from all of the other issues of the example, and it requires two additional NGATE FETs 522.

According to aspects, therefore, the present embodiments are directed to eliminating many or all of the shortcomings of conventional approaches to providing a power delivery architecture for a multiport system, including the shortcomings illustrated above.

Figure 6:
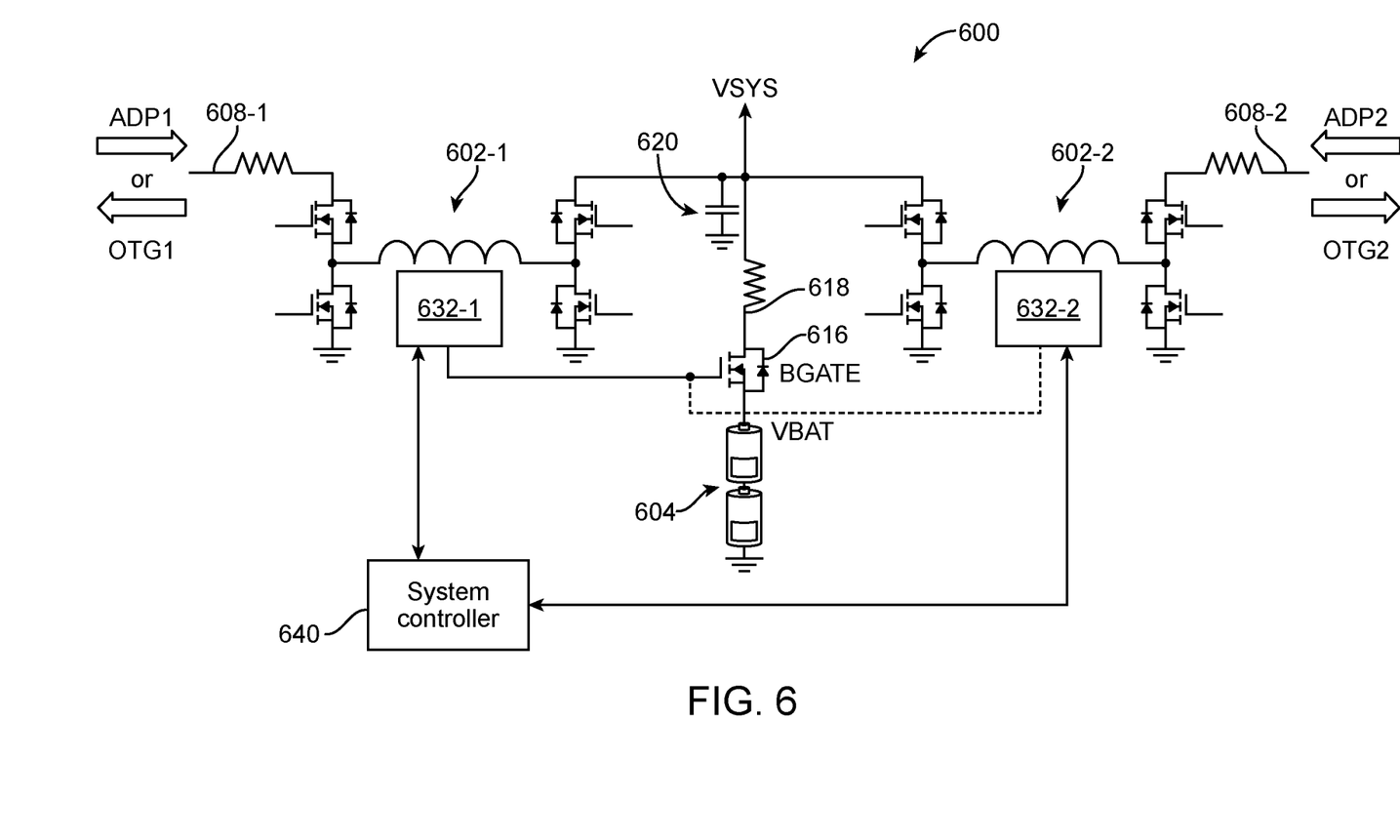
FIG. 6 is a block diagram illustrating an example approach according to the present embodiments.

FIG. 6 is a block diagram illustrating an example approach according to the present embodiments.

As shown in this example, adapters (e.g. ADP1 and ADP2) from both ports 608-1 and 608-2 (e.g. USB Type C ports) can supply charging power for battery 604 and system demand (i.e. VSYS) using chargers 602-1 and 602-2 (e.g. DC-DC converters). Moreover, full OTG functionality (i.e. providing a full range of OTG voltages from 5V to 20V) for both ports is supported by chargers 602-1 and 602-2. However, differently from the conventional approaches, these advantages are achieved at a reduced expense in terms of additional components and control schemes.

For example, the illustrated approach requires only one battery side sensing resistor 618, one BGATE FET 616 and one system side capacitor 620. As can be seen, this is accomplished by connecting the outputs both chargers 602-1 and 602-2 directly to a node that is coupled to the system load (i.e. VSYS). Both chargers are also connected to the battery 604 via the single BGATE FET 616. As will be explained in more detail below, the ability to charge battery 604, provide system power and/or supporting OTG is accomplished by appropriately detecting the presence and type of devices connected to either of ports 608-1 and 608-2, controlling the operations of chargers 602-1 and 602-2 and controlling BGATE FET 616 (which can be performed by only one of the chargers as shown in this example).

In this illustrated example, chargers 602-1 and 602-2 are buck-boost converters, with high-side/low-side switching transistors connected to either end of an inductor, as is well known in the art. However, the present embodiments are not limited to buck-boost chargers, and can include boost converters and buck converters. As further shown in FIG. 6, chargers 602 each include a controller 632. In some embodiments, controllers 632-1 and 632-2 can be implemented as separate integrated circuits, but with identical functionality. For example, as shown in FIG. 6, both controllers 632 can have an output pin and functionality for controlling a BGATE FET. However, as further shown in FIG. 6, only controller 632-1 can have the output pin actually connected to BGATE FET 616, whereas the same output pin on controller 632-2 can be left open-circuited.

In these and other embodiments, controllers 632 can be implemented as integrated circuits to which the switching transistors (and associated drivers) and inductor are externally connected. In other embodiments, some or all of the switching transistors (and/or associated drivers) and the inductor can be integrated together with controller 632 in a single integrated circuit. It should be apparent that many different implementations of controller 632 together with other charger 602 components are possible.

As shown, the illustrated approach also includes a system controller 640 such as an embedded controller (EC). Controller 640 communicates with chargers 602, including at least controllers 632 via a known protocol such as I2C or SMBus. For example, controller 640 can receive information from TCPC functionality connected to ports 608-1 and 608-2 (either in controllers 632 or elsewhere, as will be described in more detail below) regarding devices attached thereto, and send control signals to controllers 632 for controlling the operations of chargers 602 in accordance with the information.

Figure 7:
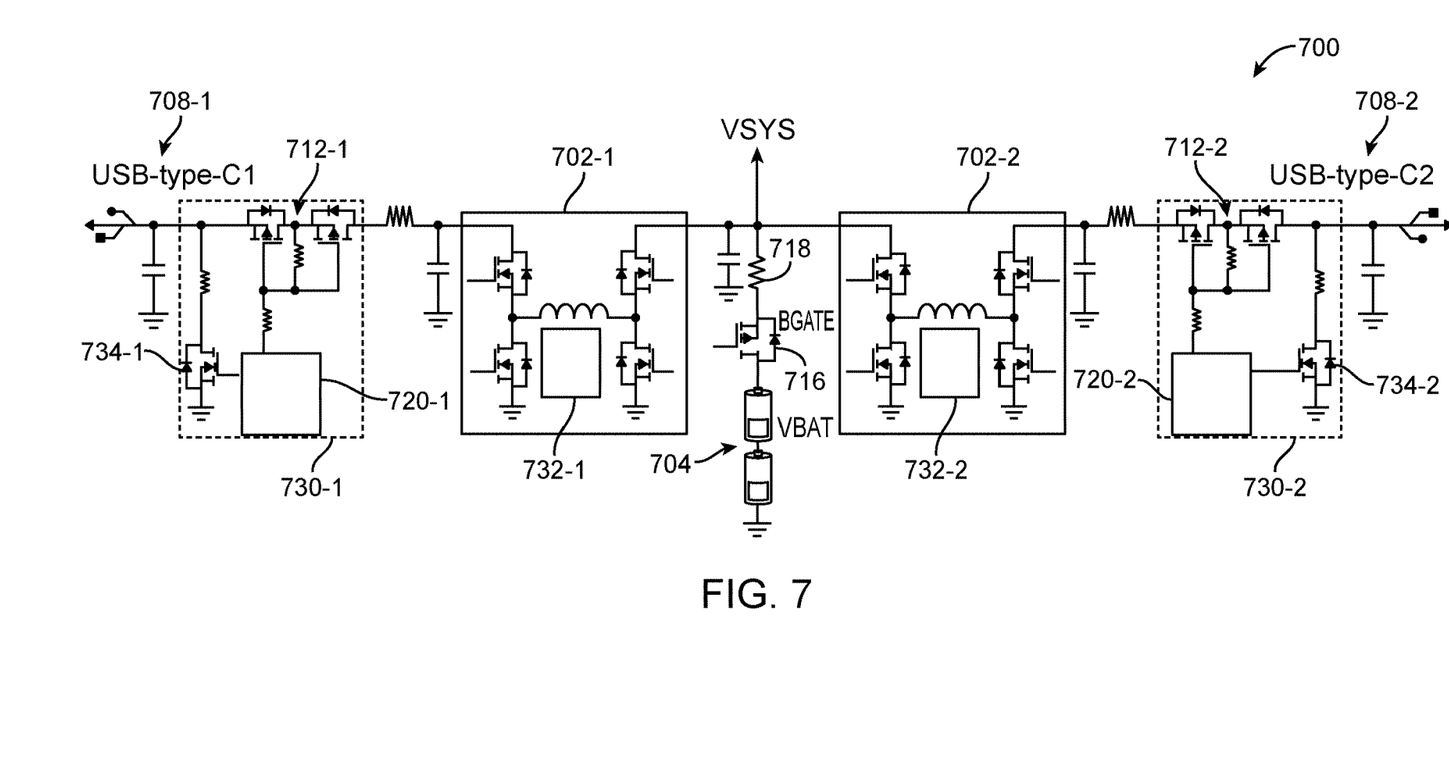
FIG. 7 is a block diagram illustrating an example implementation using an integrated circuit for a new charger product supporting the proposed architecture.

FIG. 7 is a block diagram illustrating an example implementation of the approach according to embodiments shown in FIG. 6.

As shown in this example of a multiport system 700, coupled to each port 708 is a port control module 730 and a battery charger 702. In this illustrated example, battery chargers 702 are buck-boost converters. However in other embodiments, chargers 702 can be a buck converters or boost converters.

Notably in this implementation, port control module 730 includes a PD controller 720 which monitors connections to port 708 and controls the opening and closing of back-to-back FETs 712 and FET 734. PD controller 720 can include or be implemented by a Type C port controller (TCPC), and can be implemented by a USB Power Delivery Controller R9A02G011 from Renesas Electronics America, for example. In these and other embodiments PD controller 720 is implemented by a dedicated integrated circuit separately from FETs 712 and 734. However, in other embodiments, PD controller 720 and some or all of FETs 712 and 734 can be implemented together in a common integrated circuit.

In general operation, PD controller 720 controls the FETs 712 so as to couple the OTG voltage (e.g. from the battery 704 via charger 702 and BGATE FET 716) to the port 708 when an adapter is not connected and instead a power consuming device is connected. PD controller 720 further controls the FETs 712 so as to couple the adapter voltage to the charger 702 (e.g. for providing system voltage VSYS and/or charging battery 704) when an adapter is connected to port 708. In embodiments, an embedded controller (such as EC 640 in FIG. 6, not shown) communicates with PD controllers 720-1 and 720-2 and chargers 702-1 and 702-2 as will be described in more detail below.

In this illustrated example, PD controller 720 further controls FET 734 to implement VBUS force discharge or bleed discharge to meet the USB PD requirement.

As further shown in this example, chargers 702-1 and 702-2 each include a controller 732-1 and 732-2, respectively. In general, controllers 732 provide control signals to the switching transistors in chargers 702 to implement either a buck, boost or buck-boost mode of operation. In embodiments, controllers 732 can be implemented by a separate integrated circuit, such as an ISL9238C from Renesas Electronics America, Inc. for example. In these and other embodiments, the switching transistors and inductor of chargers 702 can be implemented with discrete components connected to the controller ICs 732. In other embodiments, some or all of the switching transistors and inductor are commonly implemented together with controller 732.

In embodiments, controllers 732 can implement a narrow voltage DC (NVDC) control scheme based on a feedback of the voltage provided to the load at VSYS and a reference voltage. An EC can further communicate with controllers 732-1 and 732-2 to control the overall operation of multiport system 700 (i.e. port control modules 730 and chargers 702) for delivering power to a load (i.e. VSYS) and charging battery 704 as will be explained in more detail below. As further described above, both controllers 732 can have an output pin and functionality for controlling BGATE FET 716. However, an EC (not shown) can cause only one of controllers 732 to control the BGATE FET 716 via its output pin, whereas the same output pin on the other controller 732 can be left open-circuited or tri-stated.

As described above in connection with FIG. 6, an aspect of this implementation is that it requires only one battery side sensing resistor 718, one BGATE FET 716 and one system side capacitor 720. As can be seen, this is accomplished by connecting the outputs of both chargers 702-1 and 702-2 directly to a node that is coupled to the system load (i.e. VSYS). Further operational aspects of this implementation will be provided below.

Figure 8:
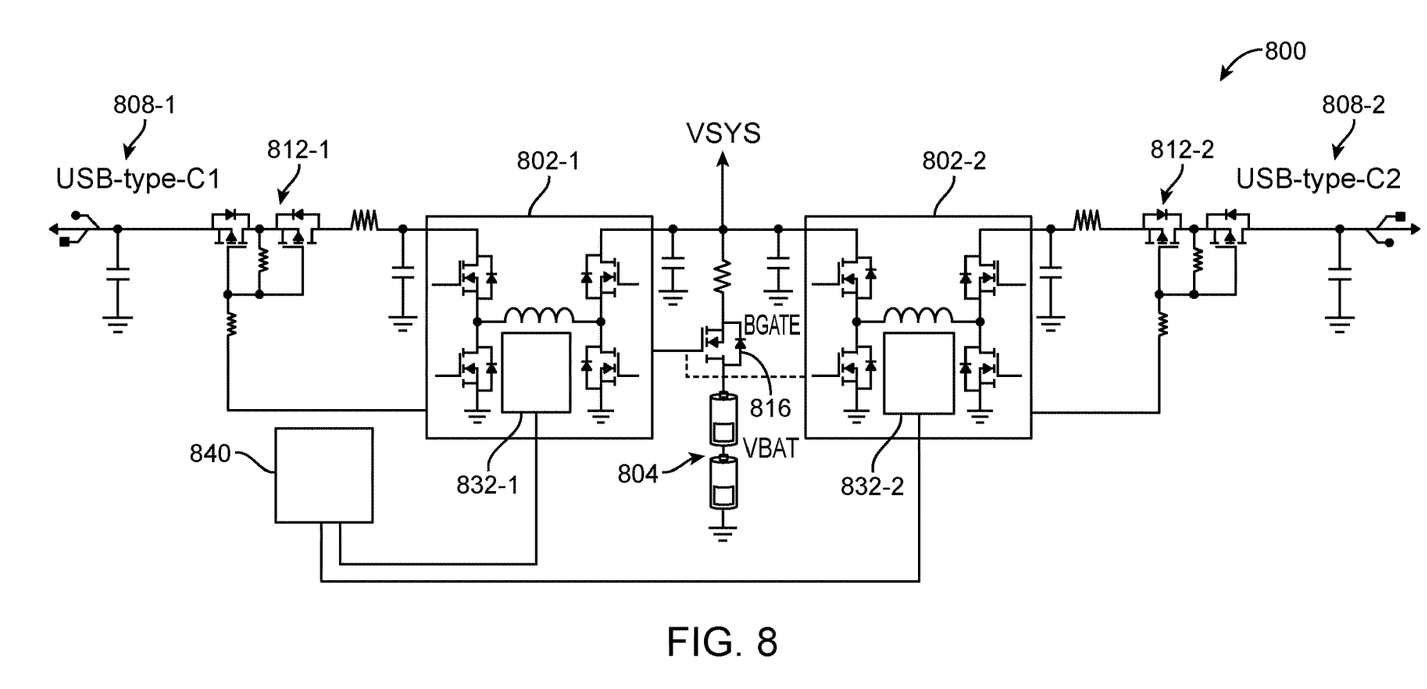
FIG. 8 is a block diagram illustrating another example implementation using a charger product integrating a USB Type-C Port Controller (TCPC) function.

FIG. 8 is a block diagram illustrating another example implementation of the approach according to embodiments shown in FIG. 6.

As can be seen in this example of a multiport system 800, coupled to each port 808 are back-to-back FETs 812 and battery charger 802. In this illustrated example, and similar to the previous example, battery charger 802 is a buck-boost converter. However in other embodiments, charger 802 can be a buck converter or a boost converter. Also similar to the previous example, and according to an aspect described above in connection with FIG. 6, this implementation is that it requires only one battery side sensing resistor 818, one BGATE FET 816 and one system side capacitor 820. As can be seen, this is accomplished by connecting the outputs of both chargers 802-1 and 802-2 directly to a node that is coupled to the system load (i.e. VSYS).

However, in this example, and differently from the embodiment in FIG. 7, there are no separate controllers coupled to the back-to-back FETs 812 such as controllers 720 in system 700. Rather, controllers 832 in chargers 802 include TCPC functionality and functionality for controlling the back-to-back FETs 812. However, similar to controllers 732, controllers 832 also provide control signals to the switching transistors in chargers 802 to implement either a buck, boost or buck-boost mode of operation. In embodiments, controllers 832 can be implemented by a separate integrated circuit, such as an Arches product from Renesas Electronics America, Inc. for example. In these and other embodiments, the switching transistors and inductor of chargers 802 can be implemented with discrete components connected to the controller ICs 832. In other embodiments, some or all of the switching transistors and inductor are commonly implemented together with controller 832.

Further differently from the embodiment in FIG. 7, system 800 shown in FIG. 8 includes manager 840, which is an example USB Type-C Port Manger (TCPM) product for managing controllers 832. Manager 840 can be a dedicated integrated circuit, such as a R9A02G015 product from Reneseas Electronics America, Inc. In other embodiments, the functionality of manager 840 can be integrated into an EC for further cost and size reduction.

In embodiments, and similar to the embodiment of FIG. 7, controllers 832 can implement a narrow voltage DC (NVDC) control scheme based on a feedback of the voltage provided to the load at VSYS and a reference voltage. An EC or manager 840 can further communicate with controllers 832-1 and 832-2 to control the overall operation of multiport system 800 (i.e. chargers 802) for delivering power to a load (i.e. VSYS) and charging battery 704 as will be explained in more detail below. As further described above, both controllers 832 can have an output pin and functionality for controlling BGATE FET 816. However, an EC or manager 840 can cause only one of controllers 832 to control the BGATE FET 816 via its output pin, whereas the same output pin on the other controller 832 can be left open-circuited or tri-stated.

It should be noted that although the implementations shown above illustrate example two-port systems, the principles of the embodiments can be extended to other multiport systems, including those having four ports or more. These other embodiments can also include only a single battery sensing resistor, output capacitor and BGATE FET, in accordance with the above-described aspects.

Figure 9:
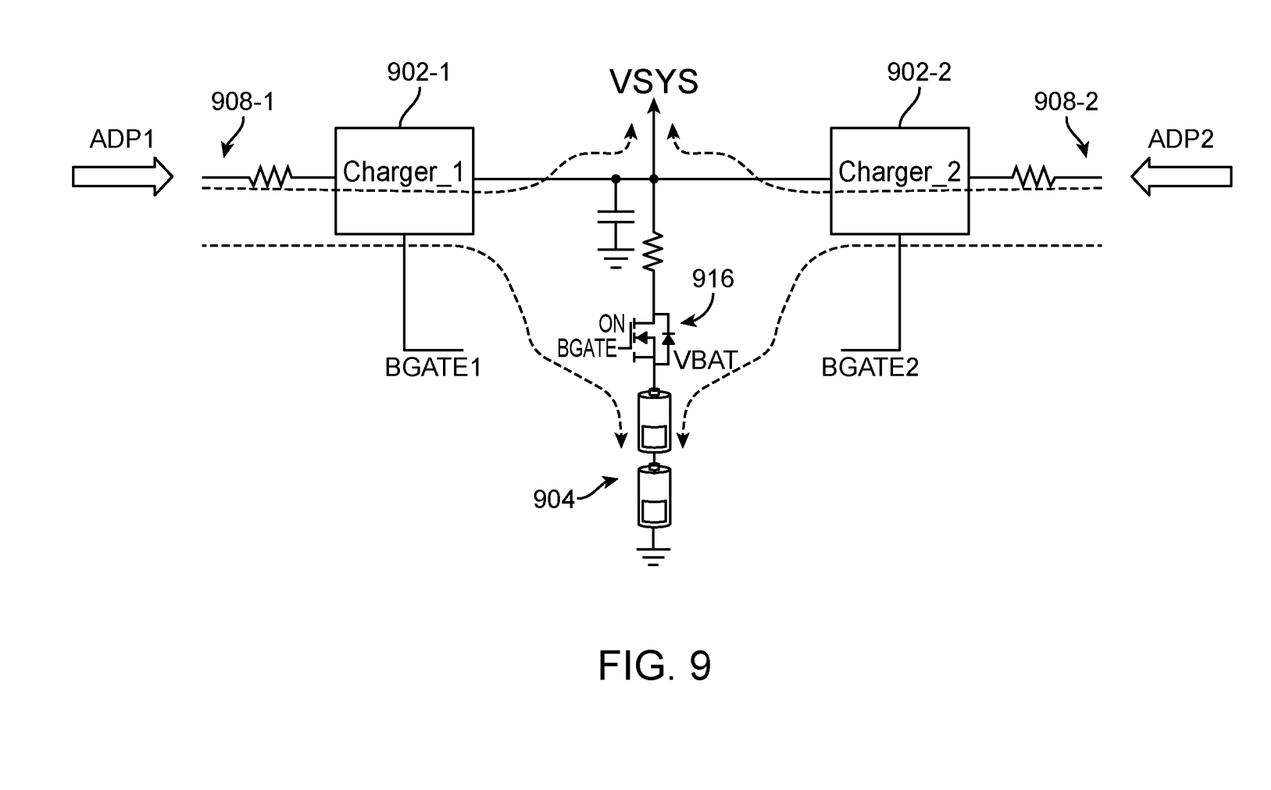
FIG. 9 is a diagram illustrating example operations of two chargers according to embodiments.

FIG. 9 is a block diagram illustrating aspects of an example methodology of managing operations of two or more chargers according to embodiments.

More particularly, this diagram illustrates operational aspects of an example where adapters are connected to both ports 908-1 and 908-2. When this situation is detected, for example by TCPC functionality in a controller 720 such as in the example of FIG. 7, or controller 832 in the example of FIG. 8, an EC or similar device (not shown) can perform the following operations.

In one example, the EC first signals charger 902-1 to set its output voltage connected to VSYS lower than the minimum battery voltage. Next, the EC signals charger 902-1 to enable charging by driving its BGATE output to the gate of BGATE FET 916 to an "on" state. At or about the same time, the EC signals charger 902-2 to set its BGATE output to tri-state. After enabling charging, the EC signals charger 902-1 to change the output voltage connected to VSYS of charger 902-1 to the maximum battery voltage. At or about the same time, the EC can signal charger 902-2 to also set its output voltage connected to VSYS to supply charging power and/or system demand.

It should be noted that although FIG. 9 illustrates an example where both chargers 902 are configured to both charge the battery 904 and supply system power to VSYS, this is not necessary. For example, the EC can be configured to select only one of chargers 902 to charge the battery 904 and/or provide system load, for example depending on the capacity of the adapter connected to either of ports 908, user configuration, etc. Moreover, this configuration can be changed dynamically, for example depending on system load and/or battery charge requirements.

After being so configured by the EC, chargers 902-1 and 902-2 can operate in a conventional fashion under control of their respective controllers (e.g. controllers 732 as described in connection with the implementation of FIG. 7 or controllers 832 as described in connection with the implementation of FIG. 8). This can include the controllers causing the chargers 902 to operate in either a buck, a boost, or a buck-boost mode of operation depending on the particular values of the adapter voltages connected to ports 908, the battery charging voltage, and the system voltage VSYS, as will be appreciated by those skilled in the art.

Figure 10:
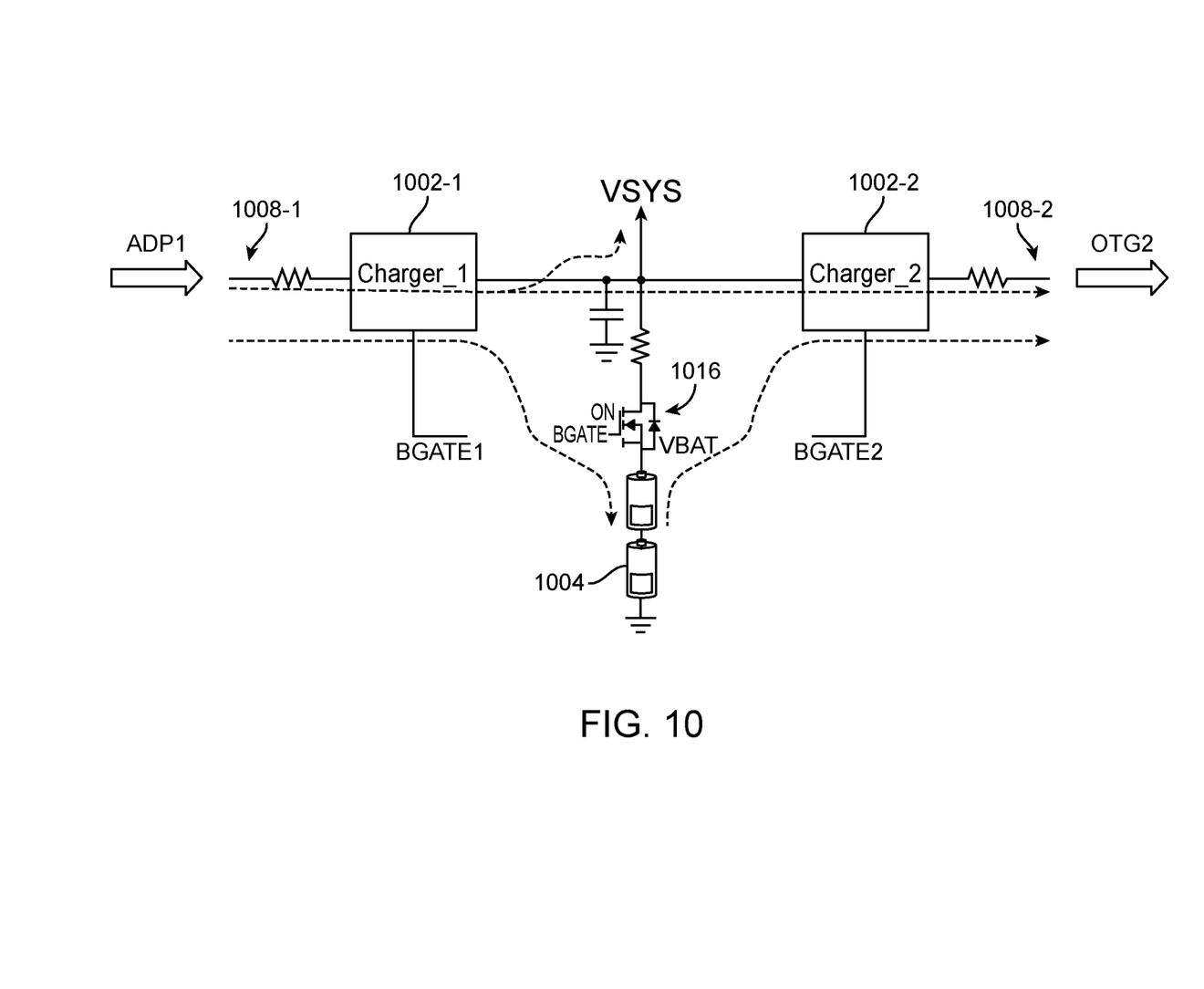
FIG. 10 is a diagram illustrating OTG aspects of example operations of two chargers according to embodiments.

FIG. 10 is a diagram illustrating additional aspects of an example methodology of managing operations of two or more chargers according to embodiments.

More particularly, this diagram illustrates operational aspects of an example where an adapter is connected to one of ports 1008-1 and 1008-2, and an OTG device is connected to another one of ports 1008-1 and 1008-2. When this situation is detected, for example by TCPC functionality in a controller 730 such as in the example of FIG. 7, or controller 832 in the example of FIG. 8, an EC or similar device can perform the following operations:

For example, EC first signals charger 1002-1 to set its output voltage connected to VSYS lower than minimum battery voltage. Next, the EC signals charger 1002-1 to enable charging by driving its BGATE output to the gate of BGATE FET 1016 to an "on" state. At or about the same time, the EC signals charger 1002-2 to set its BGATE output to tri-state. After enabling charging, change the output voltage of charger 1002-1 connected to VSYS to the maximum battery voltage. At or about the same time, the EC signals to charger 1002-2 to enable providing the detected OTG voltage to port 1008-2.

After being so configured by the EC, chargers 1002-1 and 1002-2 can operate in a conventional fashion under control of their respective controllers (e.g. controllers 732 as described in connection with the implementation of FIG. 7 or controllers 832 as described in connection with the implementation of FIG. 8). This can include the controllers causing the chargers 1002 to operate in either a buck, a boost, or a buck-boost mode of operation depending on the particular values of the adapter voltages connected to port 1008-1, the battery charging voltage, the system voltage VSYS, and the specified OTG voltage (e.g. 5V to 20V) as will be appreciated by those skilled in the art.

Figure 11:
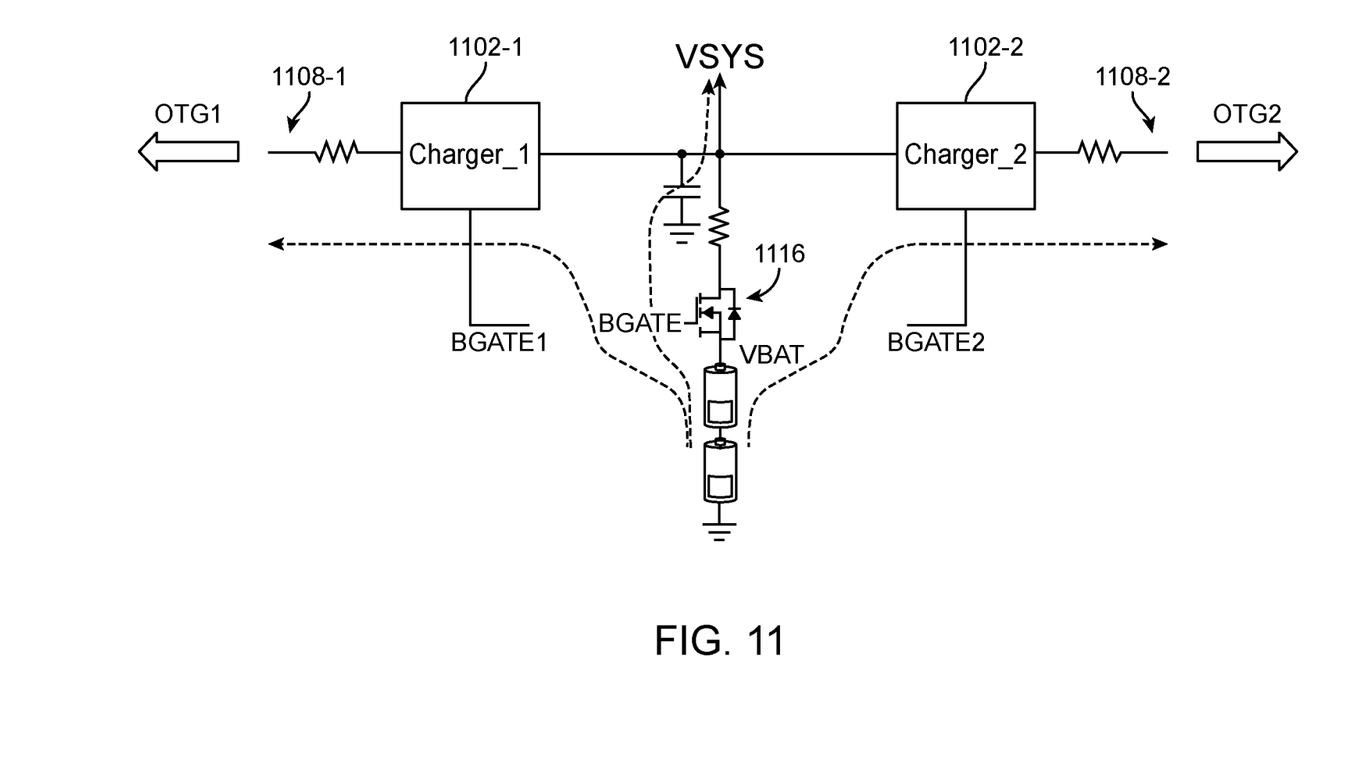
FIG. 11 is a diagram illustrating further OTG aspects of example operations of two chargers according to embodiments.

FIG. 11 is a diagram illustrating other additional aspects of an example methodology of managing operations of two or more chargers according to embodiments.

More particularly, this diagram illustrates operational aspects of an example where an OTG device is connected to both of ports 1108-1 and 1108-2. When this situation is detected, for example by TCPC functionality in a controller 720 such as in the example of FIG. 7, or controller 832 in the example of FIG. 8, an EC or similar device can perform the following operations:

For example, EC first signals charger 1102-1 to enable the battery 1104 to provide power to the load by driving its BGATE output to the gate of BGATE FET 1116 to an "on" state. At or about the same time, the EC signals charger 1102-2 to set its BGATE output to tri-state. After enabling the supply of power to the load at VSYS from the battery 1104, the EC signals to chargers 1102-1 and 1102-2 to enable providing the detected OTG voltage to ports 1108-1 and 1108-2 respectively.

After being so configured by the EC, chargers 1102-1 and 1102-2 can operate in a conventional fashion under control of their respective controllers (e.g. controllers 732 as described in connection with the implementation of FIG. 7 or controllers 832 as described in connection with the implementation of FIG. 8). This can include the controllers causing the chargers 1102 to operate in either a buck, a boost, or a buck-boost mode of operation depending on the particular values of the battery voltage, the system voltage VSYS, and the specified OTG voltages (e.g. 5V to 20V) as will be appreciated by those skilled in the art.

The preceding examples in FIGS. 9 to 11 are provided for illustrating operational aspects of a methodology according to the embodiments. However, it should be appreciated that these examples are non-limiting. More particularly, TABLE 1 below illustrates how the architecture of the present embodiments supports all possible cases for an example system having dual type-C ports.

TABLE 1

| Case | USB type-C port 1 | | USB type-C port 2 | |
|---|---|---|---|---|
| | Adapter | Device | Adapter | Device |
| 1 | N/A | N/A | N/A | N/A |
| 2 | ADP1 (5V-20V) | | | |
| 3 | | | ADP2 (5V-20V) | |
| 4 | ADP1 (5V-20V) | | ADP2 (5V-20V) | |
| 5 | ADP1 (5V-20V) | | | OTG2 |
| 6 | | OTG1 | ADP2 (5V-20V) | |
| 7 | | OTG1 | | |
| 8 | | | | OTG2 |
| 9 | | OTG1 | | OTG2 |

Although the present embodiments have been particularly described with reference to preferred examples thereof, it should be readily apparent to those of ordinary skill in the art that changes and modifications in the form and details may be made without departing from the spirit and scope of the present disclosure. It is intended that the appended claims encompass such changes and modifications.

What is claimed is:

1. A multi-port power delivery (PD) system, comprising:
   a first DC-DC converter coupled between a first adapter port and a system output;
   a second DC-DC converter coupled to a second adapter port and the system output; and
   a controller coupled to the first and second DC-DC converters, wherein the controller is configured to cause either or both of the first and second DC-DC converters to provide system power to the system output from the first and second adapter port, respectively, and to cause either or both of the first and second DC-DC converters to provide adapter power to the second and first adapter ports, respectively.

2. The multi-port PD system of claim 1, further comprising a battery,
   wherein the first DC-DC converter is further coupled between the first adapter port and the battery, and
   wherein the second DC-DC converter is further coupled between the second adapter port and the battery, and
   wherein the controller is further configured to cause either or both of the first and second DC-DC converters to provide charging power to the battery from the first and second adapter port, respectively, and to cause either or both of the first and second DC-DC converters to provide the system power from the battery to the system output.

3. The multi-port PD system of claim 1, wherein the adapter power supports full OTG requirements.

4. The multi-port PD system of claim 2, further comprising a BGATE FET coupled to the battery, wherein the BGATE FET is controlled by one of the first and second DC-DC converters.

5. The multi-port PD system of claim 3, wherein the adapter power and the system power can be delivered without turning on the BGATE FET.

6. The multi-port PD system of claim 2, further comprising a single battery current sensing resistor.

7. The multi-port PD system of claim 1, further comprising a single output capacitor connected to the system output.

8. The multi-port PD system of claim 1, wherein one or both of the first and second DC-DC converters comprises a buck-boost controller.

9. The multi-port PD system of claim 1, further comprising a first port control module coupled between the first adapter port and the first DC-DC converter.

10. The multi-port PD system of claim 9, wherein the first port control module includes a Type C port controller (TCPC).

11. A method for operating multi-port power delivery (PD) system, the system including a first DC-DC converter coupled between a first adapter port and a system output, a second DC-DC converter coupled to a second adapter port and the system output, and a controller coupled to the first and second DC-DC converters, the method comprising:
    the controller causing either or both of the first and second DC-DC converters to provide system power to the system output from the first and second adapter port, respectively; and
    the controller causing either or both of the first and second DC-DC converters to provide adapter power to the second and first adapter ports, respectively.

12. The method of claim 11, wherein the multi-port PD system further comprises a battery, the method further comprising:

the controller further causing either or both of the first and second DC-DC converters to provide charging power to the battery from the first and second adapter port, respectively; and the controller further causing either or both of the first and second DC-DC converters to provide the system power from the battery to the system output.

13. The method of claim 11, wherein the adapter power supports full OTG requirements.

14. The method of claim 12, wherein the system further comprises a BGATE FET coupled to the battery, wherein the BGATE FET is controlled by one of the first and second DC-DC converters.

15. The method of claim 13, wherein the controller causes the adapter power and the system power to be delivered without turning on the BGATE FET.

16. The method of claim 12, wherein the system further comprises a single battery current sensing resistor.

17. The method of claim 11, wherein the system further includes a single output capacitor connected to the system output.

18. The method of claim 11, wherein one or both of the first and second DC-DC converters comprises a buck-boost controller.

* * * * *